United States Patent Office 3,702,329
Patented Nov. 7, 1972

3,702,329
PROCESS FOR THE SEPARATION OF OPTICALLY ACTIVE ISOMERS FROM TETRAMISOLE
Francois Dewilde, Saint-Marc-Massy, and Guy Gabriel Frot, Noisy-la-Sec, France, assignors to Rhone-Poulenc S.A., Paris, France
No Drawing. Filed June 1, 1970, Ser. No. 42,474
Claims priority, application France, June 2, 1969, 6918033
Int. Cl. C07d 99/10
U.S. Cl. 260—306.7
6 Claims

ABSTRACT OF THE DISCLOSURE

Optical isomers are separated from a racemic base by reacting the base, or its salt with an optically inactive acid, in solution with 0.5 to 0.7 times the amount of an optically active acid theoretically required to convert completely the base into salts, and recovering the salt of the optically active acid with one optical isomer of the base by fractional crystallisation or fractional solution. The process is particularly applicable to the isolation of the l-dibenzoyl tartrate of the laevorotatory isomer of 6-phenyl-2,3,5,6-tetrahydroimidazo[2,1-b]thiazole, which is useful as an anthelmintic agent.

---

This invention relates to a process for the separation of the optically active isomers of a racemic base.

It is already known that optically active isomers can be obtained from a racemic base by reacting an optically active acid (for example, lactic acid or tartaric acid) with the racemic base or with a salt thereof with an optically inactive acid (for example, hydrochloric acid, sulphuric acid, or acetic acid) and resolving the mixture of salts thus obtained into its optical components under certain favourable conditions, for example by employing the difference in solubility of these salts in a particular medium. However this process always requires at least as much of the optically active acid as is theoretically required for complete conversion of the racemic base to the corresponding salt mixture, and in practice an excess of the optically active acid is frequently needed. As a result, the coefficient of utilisation of this optically active acid is rather low. By "coefficient of utilisation" is meant the ratio of the quantity of optically active acid in the salt of one isomer of the base obtained to the total quantity of optically active acid used.

It has now been found that an optical isomer of a racemic base can be obtained by separation of the salt of the optical isomer with an optically active acid from the mixture obtained by reacting the racemic base with only 0.5 to 0.7 times the amount of optically active acid theoretically required for complete conversion of the racemic base into the salts of the optically active acid with respectively the dextrorotatory and laevorotatory isomers of the base.

Accordingly, the invention provides a process for the separation of an optically active isomer of a racemic base in the form of a salt of the racemic base with an optically active acid, which process comprises reacting in solution the racemic base, or a salt thereof with an optically inactive acid, with a quantity of an optically active acid which is 0.5 to 0.7 times the amount theoretically required for complete conversion of the racemic base into the corresponding salts of the optically active acid with respectively the dextrorotatory and laevorotatory isomers of the base, and recovering one of these salts from the mixture by fractional solution in, or fractional crystallisation from a suitable solvent or solvent mixture. When an inactive acid addition salt of the racemic base is employed, the optically active acid may be employed in the form of an alkali metal salt.

If the preferential formation of the salt of one isomer were complete, it would theoretically suffice to use 0.5 times the amount required for complete conversion of the racemic base to the corresponding salt with the optically active acid. (In other words, only the amount of acid required to form completely a salt with one optical isomer of the base would be needed.) In practice, the selectivity is not complete, so that it is necessary to employ a slightly larger quantity of the optically active acid, frequently between 0.6 and 0.7 times the amount required for complete conversion of the racemic base to its salts.

Once the salt of an optically active acid and that isomer of the base whose salt of the optically active acid is the less soluble has been isolated, it can be converted into that isomer of the base or into other salts by methods known per se. The term "methods known per se" as used herein means any method heretofore used or described in the literature.

The process of the present invention is particularly applicable to the separation into optical isomers of racemice 6-phenyl-2,3,5,6-tetrahydro-imidazo[2,1-b]thiazole,

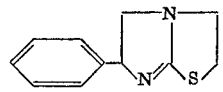

hereinafter referred to as "tetramisole" for simplicity, by preparing the neutral l-dibenzoyltartrate of the racemic base and fractionally separating the neutral l-dibenzoyltartrate of laevorotatory tetramisole. According to previously known methods, at least one mol of l-dibenzoyltartaric acid would be required to treat two mols of racemic tetramisole, whereas in the process of this invention, only 0.5 to 0.7 mol of l-dibenzoyltartaric acid is required. Thus the coefficient of utilisation of the l-dibenzoyltartaric acid is much increased (for example from about 25% to about 45%) without too much adverse effect on the yield of isolated laevorotatory tetramisole.

The preferred solvent for the fractional solution or crystallisation is water or an alcohol, the latter preferably being an alcohol of low molecular weight containing 1 to 4 carbon atoms, such as methanol, ethanol or n-propanol. It is also possible to use mixtures of alcohols or aqueous solutions of alcohols suitably containing, for example, more than 10% by weight of water. The fractional solution or crystallisation temperature can vary within wide limits but in practice temperatures of between 0 and 35° C. are most frequently used. Where, in the resolution of tetramisole, the racemic tetramisole is introduced in the form of a salt with an optically inactive acid, e.g. the hydrochloride, the neutral l-dibenzoyltartrate may conveniently be obtained by introducing the l-dibenzoyltartaric acid in the form of one of its alkali metal salts, particularly the sodium salt.

In a specific embodiment of the invention, the anthelmintically active laevorotatory isomer of 6-phenyl-2,3,5,6-tetrahydroimidazo[2,1-b]thiazole is separated from the racemic base by preparing an aqueous solution of 6-phenyl-2,3,5,6-tetrahydroimidazo[2,1-b]thiazole, 60–70% of which being in the form of the neutral l-dibenzoyltartrate, said solution at 20–25° C. optionally containing methylene chloride, precipitating the l-dibenzoyltartrate of the laevorotatory isomer and separating by filtration the precipitated l-dibenzoyltartrate of laevorotatory 6-phenyl-2,3,5,6-tetrahydroimidazo[2,1-b]thiazole.

The example which follows shows how the invention can be put into practice. The specific optical rotations ($[\alpha]_D$ values) are measured for a solution in methanol at a concentration of 4 g. per 100 ml. of solution.

EXAMPLE

Water (1 litre) is introduced into a 2 litre three-necked Pyrex flask and 95% pure l-dibenzoyltartaric acid (179 g., 0.475 mol) is then sprinkled in with stirring. 9.75 N sodium hydroxide solution (97.5 ml., containing 0.95 mole of NaOH) is introduced through a dropping funnel; three-quarters of this solution of sodium hydroxide are poured in rapidly to prevent the mixture from setting solid, and the last quarter is then added over the course of 30 minutes to adjust the final pH to 7.

Into a separate 4-litre three-necked flask containing water (400 ml.) and methylene chloride (27 ml.) racemic tetramisole hydrochloride (360.75 g., 1.5 mols) in powder form is introduced with stirring. With the temperature maintained at 20° to 22° C., the previously obtained neutral aqueous sodium l-dibenzoyltartrate solution is then poured into this flask. As the first half of the disodium l-dibenzoyltartrate solution is poured in, the reaction mixture becomes clearer; but while the second half is being introduced a precipitate again appears. The temperature of the reaction mixture is slowly raised to 25° C. over a period of 30 minutes and is maintained at this value for 2 hours. The resulting white suspension is cooled from 25° C. to 20° C. during the course of 30 minutes, vacuum filtered, and the precipitate is then twice resuspended in water (150 ml. each time) and vacuum filtered.

The resulting solid is dried for 15 hours at 60° C. under an absolute pressure of 60 mm. of mercury, yielding crystalline white neutral l-tetramisole l-dibenzoyltartrate (163.7 g., 0.213 mol, $[\alpha]_D^{25} = -133.2°$). The yield of isolated laevorotatory tetramisole is hence 56.8% of the laevorotatory tetramisole contained in the racemic base, and the coefficient of utilisation of the l-dibenzoyltartaric acid is 44.8%.

For the sake of comparison, the following experiment was carried out: An aqueous suspension of l-dibenzoyltartaric acid (358 g., 1 mol) and racemic tetramisole hydrochloride (320 g., 1.33 mols) is stirred while 10 N sodium hydroxide solution (200 ml. containing 2 mols of NaOH) is added during the course of 10 minutes at between 27° and 35° C. A temperature of between 25° and 35° C. is maintained for a further 2½ hours' stirring after comletion of the addition of the sodium hydroxide solution. The reaction mixture is then filtered at 25° C., and the precipitate washed with three 100 ml. portions of water. After drying, white crystals of the neutral l-dibenzoyltartrate of laevorotatory tetramisole (175 g., 0.23 mol $[\alpha]_D^{25} = -130°$) are thus obtained. The yield of isolated laevorotatory tetramisole is thus 69% relative to the laevorotatory tetramisole contained in the racemic mixture, but the coefficient of utilisation of the l-dibenzoyltartaric acid is only 23%.

We claim.

1. Process for the separation from racemic 6-phenyl-2,3,5,6-tetrahydroimidazo[2,1-b]-thiazole of the laevorotatory isomer which comprises reacting in solution in water, racemic 6-phenyl-2,3,5,6-tetrahydroimidazo-[2,1-b] thiazole, or a salt thereof with an optically inactive acid, with 0.5 to 0.7 times the amount of l-dibenzoyltartaric acid theoretically required to convert completely the racemic base into the l-dibenzoyltartrates of the d and l isomers of the 6-phenyl-2,3,5,6-tetrahydroimidazo[2,1-b] thiazole, and recovering the l-dibenzoyltartrate of the laevorotatory isomer of 6-phenyl-2,3,5,6-tetrahydroimidazo[2,1-b]thiazole by fractional solution in, or fractional crystallisation from, the water employed..

2. Process according to claim 1 wherein the molar amount of l-dibenzoyltartaric acid is 0.6 to 0.7 times that theoretically required for complete conversion of the racemic base into salts.

3. Process according to claim 1, wherein the temperature during the separation is 0° to 35° C.

4. Process according to claim 1 for separating the laevorotatory isomer of 6 - phenyl - 2,3,5,6 - tetrahydroimidazo[2,1-b]thiazole from the racemic base, which process comprises preparing an aqueous solution of 6-phenyl-2,3,5,6-tetrahydroimidazo[2,1-b]thiazole, 60–70% of which being in the form of the neutral l-dibenzoyltartrate, at 20–25° C., precipitating the l-dibenzoyltartrate of the laevorotatory isomer, and separating by filtration the precipitated l-dibenzoyltartrate of laevorotatory 6-phenyl-2,3,5,6-tetrahydroimidazo[2,1-b]thiazole.

5. Process according to claim 4 in which the said aqueous solution also contains methylene chloride.

6. Process according to claim 1 wherein the separated salt of one optical isomer of the base is subsequently converted to the corresponding isomer of the free base.

References Cited

UNITED STATES PATENTS 3,580,923   5/1971   Leigh _____ 260—306.7

R. J. GALLAGHER, Assistant Examiner